Figure 1:
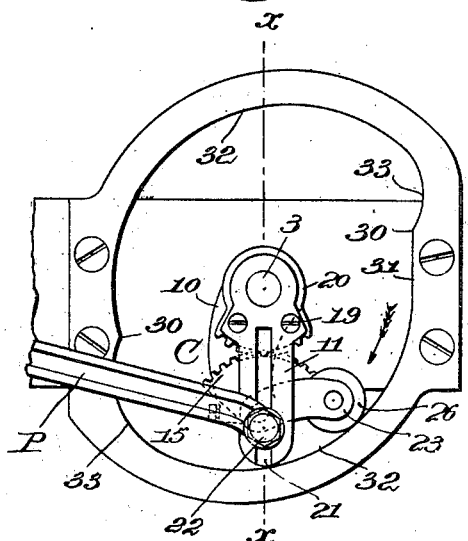

No. 678,767. Patented July 16, 1901.
C. F. ROPER.
MECHANICAL MOVEMENT.
(Application filed Mar. 20, 1901.)
(No Model.)

Witnesses.
Adolph B. Kaiser.
Edward F. Allen.

Inventor.
Charles F. Roper,
by Crosby & Gregory
atty's.

UNITED STATES PATENT OFFICE.

CHARLES F. ROPER, OF HOPEDALE, MASSACHUSETTS, ASSIGNOR TO DRAPER COMPANY, OF SAME PLACE AND PORTLAND, MAINE.

MECHANICAL MOVEMENT.

SPECIFICATION forming part of Letters Patent No. 678,767, dated July 16, 1901.

Application filed March 20, 1901. Serial No. 52,060. (No model.)

*To all whom it may concern:*

Be it known that I, CHARLES F. ROPER, a citizen of the United States, residing at Hopedale, in the county of Worcester and State of Massachusetts, have invented an Improvement in Mechanical Movements, of which the following description, in connection with the accompanying drawings, is a specification, like characters on the drawings representing like parts.

It is the object of my invention to provide a novel mechanical movement which is especially adapted for converting rotary into an even and uniform reciprocating movement.

Where the ordinary crank and pitman is employed for converting rotary into reciprocating movement, or vice versa, the speed of the reciprocating element varies at different points of the stroke, and the said reciprocating element will dwell for a considerable length of time at the end of its stroke or when the crank-arm is passing the dead-center point. In order to avoid this difficulty, I have connected the end of the pitman or other connection to the crank-shaft by a connecting member which is in the nature of a differential crank-arm, the said crank-arm operating to give the end of the pitman to which it is connected a variable angular velocity, the angular velocity of the said end of the pitman having a gradually-accelerated movement at the end of the stroke or as the crank-arm approaches or recedes from the dead-center point and a retarded movement during the intermediate portions of the stroke. Mechanism is also provided to cause the end of the pitman to pass the dead-center point with a greatly-accelerated movement, so that the reciprocating element is given a quick reverse at the end of its stroke.

Preferably my differential crank-arm comprises two members, one of which is fast upon the crank-shaft and is for convenience referred to as the "fixed" member and the other of which is in the nature of a compensating member and is loosely mounted upon the said crank-shaft, the said compensating member having connected thereto the pitman or other connection between the crank-arm and the reciprocating element. The two members of the differential crank-arm are suitably geared together, and suitable means, preferably a cam, is employed to give the compensating member a varying differential movement with respect to the fixed member, the movement of the compensating member being a gradually-accelerated movement with reference to the fixed member as the crank-arm approaches or recedes from the dead-center point and a retarded movement intermediate these points, such varying differential movement of the compensating member with reference to the fixed member operating to give to the reciprocating element an even uniform speed throughout its reciprocation. As the reciprocating element reaches the end of its stroke suitable mechanism is provided for giving to the compensating member a quick forward movement with reference to the fixed member, whereby the compensating member and pitman or other connection are quickly thrown past the dead-center point and the compensating element will begin its return stroke without any appreciable delay or dwell at the end of the stroke.

Figure 2:
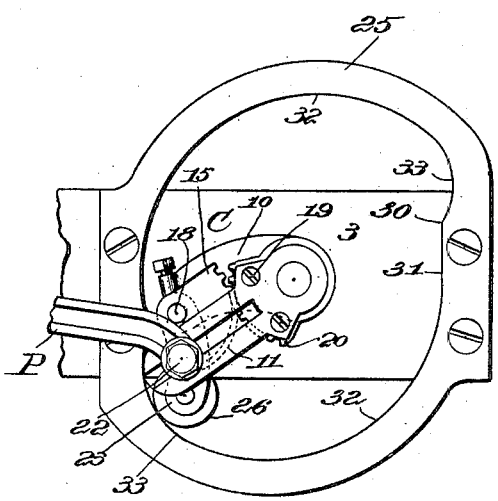
Figure 3:
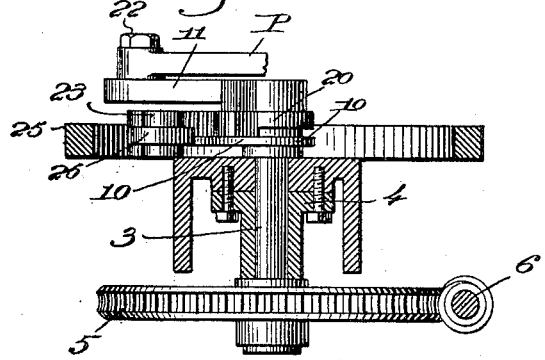
Figure 4:
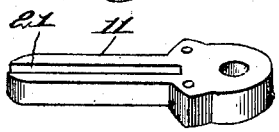
Figure 5:

Referring to the drawings, Figures 1 and 2 are plan views of my mechanical movement, showing different positions thereof. Fig. 3 is a section on the line *x x*, Fig. 1; and Figs. 4, 5, 6, and 7 are detail views of the two members of the differential crank-arm.

The crank-shaft or other driving-shaft is designated by 3, and this is mounted in any suitable bearings 4 and may be driven in any suitable way, according to the use to which the device is to be put. As illustrated in the drawings, the said crank-shaft is given a uniform rotary movement by means of a gear 5, fast thereon, which meshes with and is driven by another gear 6 upon a suitable driving-shaft. The rotary movement of the crank-shaft or driving-shaft 3 is converted into a reciprocating motion and is communicated to the reciprocating element (not shown) by means of the crank-arm C and the pitman-rod or other connecting member P. The crank-arm C is designed, as stated above, to give to the reciprocating element a gradual acceleration as it approaches and leaves each end of its stroke and a retarded motion during the central portion of the stroke, thus counteracting or balancing the uneven reciprocating motion due to the ordinary crank-arm and giving to the reciprocating element a resultant reciprocation which is uniform throughout the entire length of the stroke. To accomplish this result the crank-arm C is what I term a "differential" crank-arm, it comprising two members, one of which, 10, is rigidly fastened to the crank-shaft 3 by any suitable means, preferably by the usual key, and is for convenience termed the "fixed" member, while the other member 11, which is called the "compensating" member and which is pivotally connected to the pitman P, is supported in some suitable way for turning movement relative to the fixed member, it being shown in this embodiment of my invention as loosely mounted upon the crank-shaft. The fixed member and the compensating member of the crank-arm are suitably geared together, and a suitable mechanism is provided for giving the compensating member a varying differential motion with respect to the fixed or fast member, as above described. The free end of the fixed or fast member 10 has pivotally mounted thereon the segmental gear 15, the said gear 15 being provided with the arm 16, between which arm and the gear 15 the bearing 17 in the end of the arm or fixed member 10 is positioned, a pivot-pin 18 passing through suitable apertures in the gear 15 and arm 16 and the bearing 17 serving to thus pivotally connect the segmental gear with the fast member 10.

The compensating member 11 of the crank-arm, which is mounted for turning movement relative to the fixed member 10, may be supported in any suitable way, one good and convenient way being to loosely mount the same upon the crank-shaft, as stated, and the said compensating member has rigidly secured thereto, as by screws 19, the segmental gear 20, which meshes with the segmental gear 15, as plainly seen in Figs. 1 and 2. The compensating member 11 has adjustably pivoted thereto the pitman P, preferably by making the said compensating member with the slot 21, in which the bolt 22, passing through the end of the pitman, is adjustably secured. With this construction it will be obvious that if the segmental gear 15 is turned about its pivot the compensating member 11 will be given a differential movement with respect to the fixed member 10 of the crank-arm, and by providing suitable mechanism for giving to the compensating member 11 a gradually-accelerated movement with reference to the fixed member 10 as the crank-arm approaches or recedes from its dead-center point and a gradually-retarded movement during the central portion of the stroke of the crank-arm the reciprocating element will be given a resultant movement which will be uniform throughout all points of its stroke, and by giving to the gear 15 a quick turn just as the dead-center point is reached the compensating member and pitman P will be quickly thrown past the dead-center point, so that the reciprocating element will not dwell at the end of its stroke. In order to thus control the segmental gear 15, so as to give to the compensating member 11 a varying differential movement with respect to the fixed member 10, I preferably provide the said segmental gear with an arm 23, which bears against the interior cam-surface of a suitable cam 25, the said cam being supported in any suitable way and surrounding the differential arm, as shown in Figs. 1 and 2.

Figure 6:
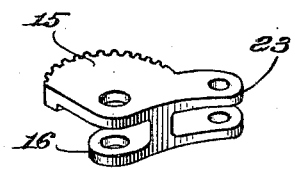
Figure 7:
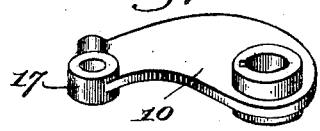

In order to reduce friction between the arm 23 and the cam-surface, I preferably pivot to the arm 23 and antifriction-roll 26, which bears against the cam-surface, and for this purpose the arm 23 will be made forked, as illustrated in Fig. 6, between the branches of which the antifriction-roll may be pivoted.

The cam 25 is what I term a "double" cam, it having two duplicate cam-surfaces, against one of which the roll 26 operates during the forward movement of the reciprocating element and against the other of which the said roll operates during the return movement of the said reciprocating element. Each portion of the cam has the point or rise 30 so positioned that the roll 26 will engage the same just as the crank-arm is passing its dead-center point, the flattened portion 31, which the roll 26 engages as the reciprocating element begins its reciprocation, the gradually-receding eccentric portion 32, which the roll 26 engages during the central portion of the stroke, and the gradually-rising portion 33, which the roll engages as the reciprocating element approaches the end of its stroke.

The operation of the cam and the compensating crank-arm will be readily understood from the foregoing description and is as follows: Assuming that the crank-arm is moving in the direction of the arrow, Fig. 1, and that the crank-arm is on a dead-center at the right hand in Figs. 1 and 2, in which case the roll 26 will be just about to pass the crown of the rise or point 30, it will be seen that as the fast member 10 of the crank-arm moves through the first portion of its stroke the roll 26 in passing over the flattened portion 31 of the cam-surface operates to turn the gear 15 backward and thus through the gear 20 give to the compensating member 11 a forward differential movement with respect to the fixed member 10. As the differential crank-arm C moves into the position shown in Fig. 1 the gradually-receding portion 32 of the cam-surface, which portion has a progressively-increased radius, allows the gear 15 to gradually swing clockwise or forward upon its pivot 18, such forward movement of the gear 15 on its pivot serving to give to the compensating member 11 of the crank-arm a backward differential movement with respect to the fixed member 10, the said compensating member 11 falling behind the fixed member 10, so that the resultant movement given to the reciprocating element will be slower than would be the case if the pitman were connected directly to the fixed arm, for in the position shown in Fig. 1 an ordinary crank-arm is in its most effective position. When the crank-arm reaches the position shown in Fig. 2, the roll 26 engages the rising portion 33 of the cam-surface and operates through the segmental gears to give to the compensating member 11 a forward differential movement with respect to the fixed member 10, such increase of speed of the compensating member over the fixed member being sufficient to counteract the normally-retarded movement of the reciprocating element as it approaches the end of the stroke due to the ordinary crank motion, and thus give to the said reciprocating element a movement which is of the same speed as its movement during the center portion of the stroke. As the roll 26 passes over the rise 30 the segmental gear 15 is given a quick forward turn, which, as will be readily understood, operates to throw the compensating member and pitman P past the dead-center point with a greatly-accelerated movement, so that the reciprocating element will upon its reaching the end of its stroke immediately begin its return movement without any appreciable dwell.

Where it is desired to convert a uniform rotary motion into an even or uniform reciprocating movement, as above described, it will be understood that in the practical construction of the cam 25 said cam will be so designed and the various portions of the cam-surface will be so shaped as to give to the compensating member of the crank-arm a rotary motion of such a character that the motion of the reciprocating element will be uniform.

It will thus be seen that I have provided a very simple and efficient crank motion and at the same time provided means whereby the reciprocating element is given a quick reverse at the end of its stroke and is not allowed to dwell or pause, as is the case when an ordinary crank-motion is employed.

It will be obvious to those skilled in the art that my invention may be employed in any device where it is desired to convert rotary motion into an even reciprocating movement, and it will also be obvious that by varying the contour of the cam-surface the speed of the reciprocating element may be varied at different portions of its stroke, so that by my invention it is possible to convert a rotary motion into a reciprocating motion of uniform speed or of varying speed, as may be desired.

Having described my invention, what I claim, and desire to secure by Letters Patent, is—

1. In a mechanical movement, a crank-shaft, a pitman, a differential crank-arm connecting said crank-shaft and pitman, said crank-arm comprising two members, and gears connecting the same, and means to give one of said members a variable differential movement with relation to the other during the rotation of the crank-shaft.

2. In a mechanical movement, a crank-shaft, a pitman, a differential crank-arm comprising two members, said crank-arm connecting the crank-shaft and pitman, and means to give one of said members of the crank-arm a variable differential movement with respect to the other during the rotation of the crank-shaft.

3. Means for converting rotary into reciprocating movement, said means comprising a rotating element, a differential crank-arm comprising two members connected to and having the same axis of rotation as said rotating element, means to give one of said members an accelerated differential movement with respect to the other member when the crank-arm is approaching or receding from its dead-center point, and means to connect the crank-arm with the reciprocating element.

4. Means for converting rotary into reciprocating movement, said means comprising a rotating element, a differential crank-arm connected to the rotating element, said crank-arm comprising two members rotating about a common axis, means to give one of said members an accelerated differential movement with respect to the other when the crank-arm is approaching or receding from its dead-center point, and a retarded differential movement during the remainder of the stroke, and connections between the crank-arm and the reciprocating element.

5. A mechanical movement comprising a shaft, a crank-arm connected thereto, said crank-arm comprising a member fast on the shaft, and a member loose thereon, gears connecting said members, and means to give said loose member a differential movement with respect to the fast member.

6. A mechanical movement comprising a shaft, a crank-arm connected thereto, said crank-arm comprising a member fast on the shaft, and a compensating member loose thereon, gear connections between said members, means to give said compensating member a varying differential movement with respect to the fast member, and connections between said compensating member and the reciprocating element.

7. A crank-motion for giving a uniform speed of reciprocation, comprising a shaft, a differential crank-arm thereon, said crank-arm comprising a member fast on said shaft, a compensating member loose thereon, means for connecting said members for relative movement, and means for giving to the compensating member a forward differential movement as the crank-arm approaches or recedes from the end of its stroke, and a backward differential movement during the central portion of its stroke.

8. Means for converting rotary motion into reciprocating motion, said means comprising a shaft, a differential crank-arm thereon, said crank-arm comprising a member fixed to the shaft, a compensating member loose upon the shaft, a gear pivotally mounted upon the fixed member and engaging the compensating member, said gear having an arm, and a cam surrounding the crank-arm and coöperating with the arm on the gear, whereby the compensating member is given a varying differential motion with respect to the fixed member.

9. Means for converting rotary into reciprocating motion, comprising a shaft, a differential crank-arm thereon, said crank-arm comprising a member fixed to the shaft, and a compensating member loose thereon, a gear pivotally mounted upon the fixed member, a coöperating gear on the loose member, said pivotally-mounted gear having an arm, and a cam surrounding the crank-arm and coöperating with the arm on the gear, said cam being so shaped as to give to the compensating member a forward differential movement with respect to the fixed member as the crank-arm approaches or recedes from the end of its stroke, and backward differential movement during the intermediate portion of its stroke.

10. A mechanical movement comprising a rotating element, a differential crank-arm connected thereto and comprising two members, and a cam controlling the movements of one of said members relative to the other, whereby one of said members is given a differential movement with reference to the other.

11. In a mechanical movement, a rotating element, a differential crank-arm connected thereto, said crank-arm comprising two members mounted for relative movement, gears connecting said members, and means for giving one of said members a differential movement with respect to the other.

12. Means for converting rotary into reciprocating motion, said means comprising a rotating element, a differential crank-arm connected thereto, said crank-arm comprising two members, gears connecting said members, and means for operating said gears to give one of said members of the crank-arm a varying differential movement with respect to the other, and connections between said first-named member and the reciprocating element.

In testimony whereof I have signed my name to this specification in the presence of two subscribing witnesses.

CHARLES F. ROPER.

Witnesses:
 GEORGE OTIS DRAPER,
 ERNEST W. WOOD.